US012636893B2

(12) United States Patent
Yoshida et al.

(10) Patent No.: US 12,636,893 B2
(45) Date of Patent: May 26, 2026

(54) DEGASSING DEVICE AND INKJET RECORDING APPARATUS

(71) Applicant: KYOCERA Document Solutions Inc., Osaka (JP)

(72) Inventors: Takeru Yoshida, Osaka (JP); Hiroaki Watanabe, Osaka (JP); Hideki Ishida, Osaka (JP); Takeshi Watanabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 303 days.

(21) Appl. No.: 18/635,263

(22) Filed: Apr. 15, 2024

(65) Prior Publication Data

US 2024/0351345 A1 Oct. 24, 2024

(30) Foreign Application Priority Data

Apr. 19, 2023 (JP) ................................ 2023-068655

(51) Int. Cl.
*B41J 2/19* (2006.01)
*B41J 2/175* (2006.01)

(52) U.S. Cl.
CPC ............ *B41J 2/19* (2013.01); *B41J 2/17556* (2013.01); *B41J 2/17566* (2013.01)

(58) Field of Classification Search
CPC ...... B41J 2/19; B41J 2/17556; B41J 2/17566; B41J 2/175; B41J 2/18
See application file for complete search history.

(56) References Cited

U.S. PATENT DOCUMENTS

2019/0263135 A1 8/2019 Abe et al.
2020/0180320 A1 6/2020 Abe et al.
2022/0072866 A1 3/2022 Abe et al.

FOREIGN PATENT DOCUMENTS

JP 2010162821 A 7/2010
JP 2019142189 A 8/2019
KR 102301582 B1 * 9/2021 ................ B41J 2/18

* cited by examiner

*Primary Examiner* — Justin Seo
(74) *Attorney, Agent, or Firm* — Studebaker Brackett PLLC

(57) ABSTRACT

A degassing device removes air dissolved in a liquid under a pressure decreased atmosphere, and includes a liquid tank, a pressure decreasing device, a circulation flow pass, a circulation device, and a variable mechanism. The liquid tank stores the liquid. The pressure decreasing device decreases pressure in the liquid tank. The circulation flow pass communicates different positions of the liquid tank. The circulation device circulates the liquid through the circulation flow pass. The variable mechanism changes a height of an inlet port from the circulation flow pass to the liquid tank in accordance with a height of a liquid surface in the liquid tank.

6 Claims, 9 Drawing Sheets

DEGASSING DEVICE AND INKJET RECORDING APPARATUS

INCORPORATION BY REFERENCE

This application is based on and claims the benefit of priority from Japanese patent application No. 2023-068655 filed on Apr. 19, 2023, which is incorporated by reference in its entirety.

BACKGROUND

The present disclosure relates to a degassing device and an inkjet recording apparatus.

In an inkjet recording apparatus, when an amount of dissolved gas of ink increases, bubbles may be generated inside a recording head, causing an ejection failure. Therefore, a technique for decreasing the amount of dissolved gas in ink has been studied. For example, there has been proposed a configuration in which ink in an ink tank is stirred under a state where pressure in the ink tank is decreased to degas the ink.

In the above degassing device, the ink in the ink tank is stirred, and the ink is degassed near the liquid surface. However, since the stirrer is located at the bottom of the ink tank, when the liquid surface of the ink is high, it becomes difficult to replace the ink near the liquid surface where the amount of dissolved gas is small with the ink near the bottom surface where the amount of dissolved gas is large, and degassing efficiency is lowered.

SUMMARY

A degassing device according to the present disclosure removes air dissolved in a liquid under a pressure decreased atmosphere, and includes a liquid tank, a pressure decreasing device, a circulation flow pass, a circulation device, and a variable mechanism. The liquid tank stores the liquid. The pressure decreasing device decreases pressure in the liquid tank. The circulation flow pass communicates different positions of the liquid tank. The circulation device circulates the liquid through the circulation flow pass. The variable mechanism changes a height of an inlet port from the circulation flow pass to the liquid tank in accordance with a height of a liquid surface in the liquid tank.

An image forming apparatus according to the present disclosure includes the degassing device and a recording head which ejects the liquid degassed by the degassing device.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
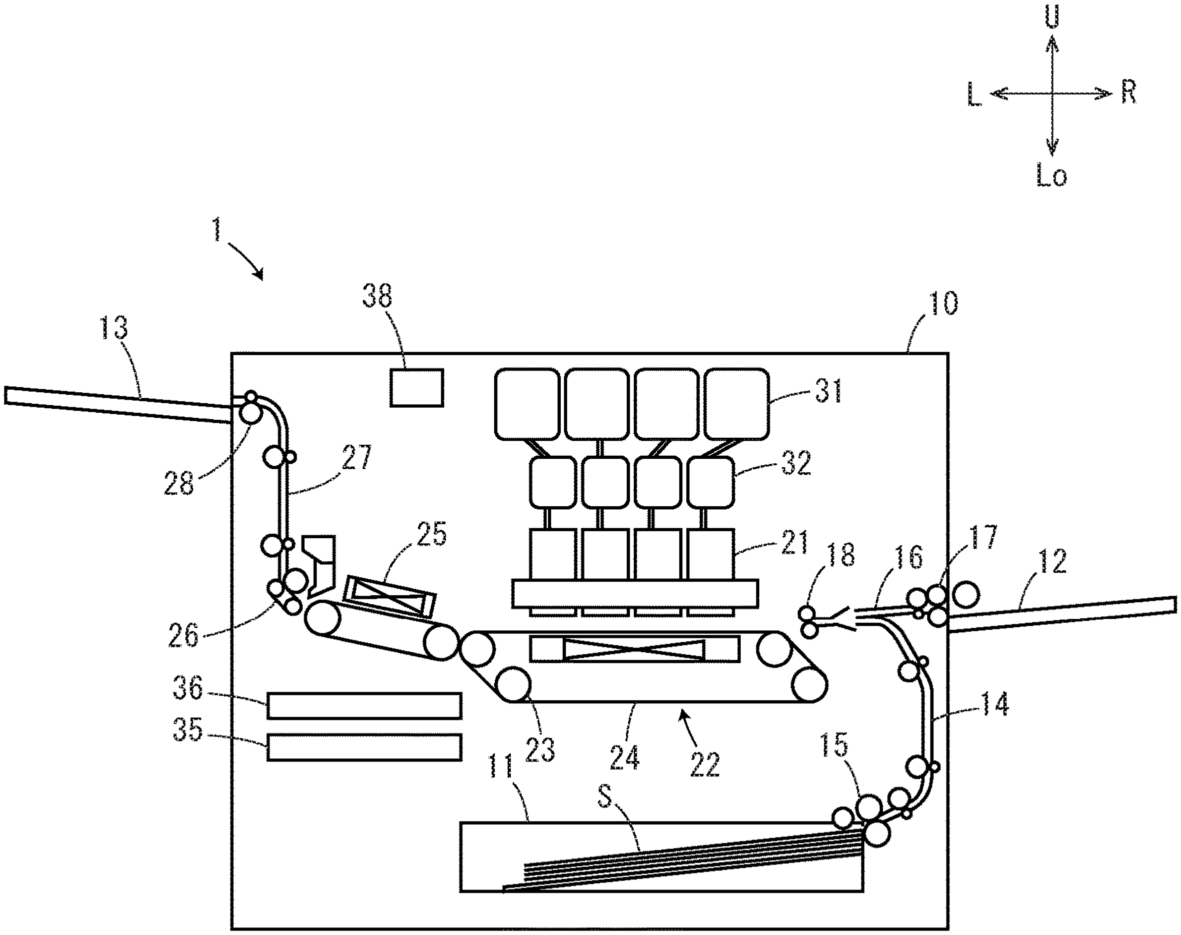
FIG. 1 is a schematic view showing an inkjet recording apparatus according to one embodiment of the present disclosure.

Hereinafter, with reference to the drawings, an inkjet recording apparatus 1 of the present embodiment will be described. FIG. 1 is a schematic view showing the inkjet recording apparatus 1 according to the present embodiment. For convenience of explanation, the front side of the paper surface on which FIG. 1 is drawn is defined as the front side of the inkjet recording apparatus 1, and the left-and-right direction will be described with reference to the direction in which the inkjet recording apparatus 1 is viewed from the front side. The arrows L, R, U, and Lo attached to each figure indicate the left, right, upper, and lower sides of the inkjet recording apparatus 1, respectively.

An inkjet recording apparatus 1 ejects ink from each inkjet recording head 21 toward a sheet S as a recording medium and performs printing. The inkjet recording apparatus 1 includes a box-shaped housing 10 in which various kinds of device are housed. In the lower portion of the housing 10, a sheet feeding cassette 11 in which the sheet S is set is housed, and a manual sheet feeding tray 12 on which the sheet S is set by hand is installed on the right side surface of the housing 10. On the upper portion of the left side surface of the housing 10, a sheet discharge tray 13 on which the recorded sheet S is stacked is installed.

In the right side portion in the housing 10, a first conveyance path 14 along which the sheet S is conveyed from the sheet feeding cassette 11 to the recording head 21 provided in the center of the housing 10 is formed. On the upstream side of the first conveyance path 14, a first sheet feeding part 15 which feeds the sheet S from the sheet bundle in the sheet feeding cassette 11 is provided, and a registration roller 18 which adjusts the feeding timing of the sheet S is provided in the downstream portion of the first conveyance path 14. Further, a sheet feeding path 16 of the manual sheet feeding tray 12 is merged with the downstream portion of the first conveyance path 14, and a second sheet feeding part 17 which feeds the sheet S from the sheet bundle on the manual sheet feeding tray 12 is provided on the sheet feeding path 16.

On the downstream side of the registration roller 18, a conveying device 22 and the recording head 21 provided for each color (for example, black, cyan, magenta, and yellow) are installed. The registration roller 18 corrects the skew of the sheet S and then sends the sheet S to the conveying device 22 in accordance with the ink ejecting operation by each recording head 21. In the housing 10, an ink container 31 and an ink tank 32 for each recording head 21 are provided. The ink of each ink container 31 is temporarily stored in the ink tank 32, the ink is degassed as necessary, and then the ink is supplied from the ink tank 32 to the recording head 21.

The conveying device 22 is constituted by winding a conveyance belt 24 around a plurality of tension rollers 23 installed below the recording heads 21. On the downstream side of the conveying device 22, a drying device 25 which dries the ink of the sheet S is provided. On the downstream side of the drying device 25, a decurl device 26 which corrects the curl generated on the sheet S by drying the ink is provided. On the downstream side of the decurl device 26, a second conveyance path 27 along which the sheet S is conveyed toward the sheet discharge tray 13 is formed. In the downstream portion of the second conveyance path 27, a sheet discharge part 28 which discharges the recorded sheet S to the sheet discharge tray 13 is provided.

Below the drying device 25, a maintenance unit 35 which cleans the recording heads 21 and a cap unit 36 which caps the recording heads 21 are provided. The maintenance unit 35 is provided with a squeegee-shaped wiping blade, and the wiping blade scrapes the ink remaining on the nozzle surface of the recording head 21. The cap unit 36 is provided with a head cap, and the nozzle surface of the recording head 21 is capped with the head cap. The head cap suppresses drying of the ink in the nozzle. The drying of the ink in the nozzle may be further suppressed by storing a liquid such as a cleaning liquid in the head cap.

Further, the inkjet recording apparatus 1 is provided with a control device 38 for controlling the entire apparatus. The control device 38 may be composed of a processor or a logic circuit (hardware) formed in an integrated circuit or the like. In the case of a processor, the processor reads and executes a program stored in a memory, and various processes are executed. For example, a CPU (Central Processing Unit) is used as the processor. The memory is constituted by one or more storage devices such as a ROM (Read Only Memory), a RAM (Random Access Memory) or the like depending on the application.

At the time of image recording, the sheet S is fed from the sheet feeding cassette 11 and the manual sheet feeding tray 12 by the first sheet feeding part 15 and the second sheet feeding part 17, respectively, and then sent to the registration roller 18. In accordance with the ejecting timing of the ink, the sheet S is conveyed from the registration roller 18 to the conveyance belt 24, the degassed ink is ejected from each recording head 21, and a color image is recorded on the surface of the sheet S. The sheet S is dried by the drying device 25, and the curl of the sheet S is corrected by the decurl device 26. The sheet S is conveyed to the sheet discharge part 28 through the second conveyance path 27, and the recorded sheet S is discharged to the sheet discharge tray 13 by the sheet discharge part 28.

By the way, the liquid surface of the ink touches the air in the ink tank 32, and the dissolving of the air proceeds, and the nozzle of the recording head 21 may be clogged by bubbles in the ink. Therefore, it is desired to appropriately keep an amount of dissolved gas in the ink. For example, a method has been proposed in which by passing the ink through the hollow fiver filter in a state where the pressure of the circumference of the hollow fiber filter is decreased, the air is moved from the wall surface of the hollow fiber to the pressure decreased side to degas the ink. This method requires the expensive hollow fiber filter and requires periodic replacement operations, which increase cost.

In order to prevent the clogging of the nozzle, a method (hereinafter referred to as the stirring degassing method) has been proposed in which the ink is stirred by the stirrer in a state in which the pressure in the ink tank 32 is decreased below an atmospheric pressure to degas the ink. In the stirring degassing system, a magnetic force is externally applied to the stirrer in the ink tank 32, and the stirrer is rotated by the magnetic force to stir the ink in the ink tank 32. When the depth of the ink and the tank diameter are large, the ink is difficult to be stirred, and the degassing efficiency is lowered. As the rotational speed of the stirrer is increased, the stirring becomes easier, but when the rotational speed of the stirrer becomes too high, a detuning phenomenon occurs and the rotational sound of the stirrer becomes large. Therefore, in the present embodiment, a circulating degassing method shown below is adopted.

Figure 2:
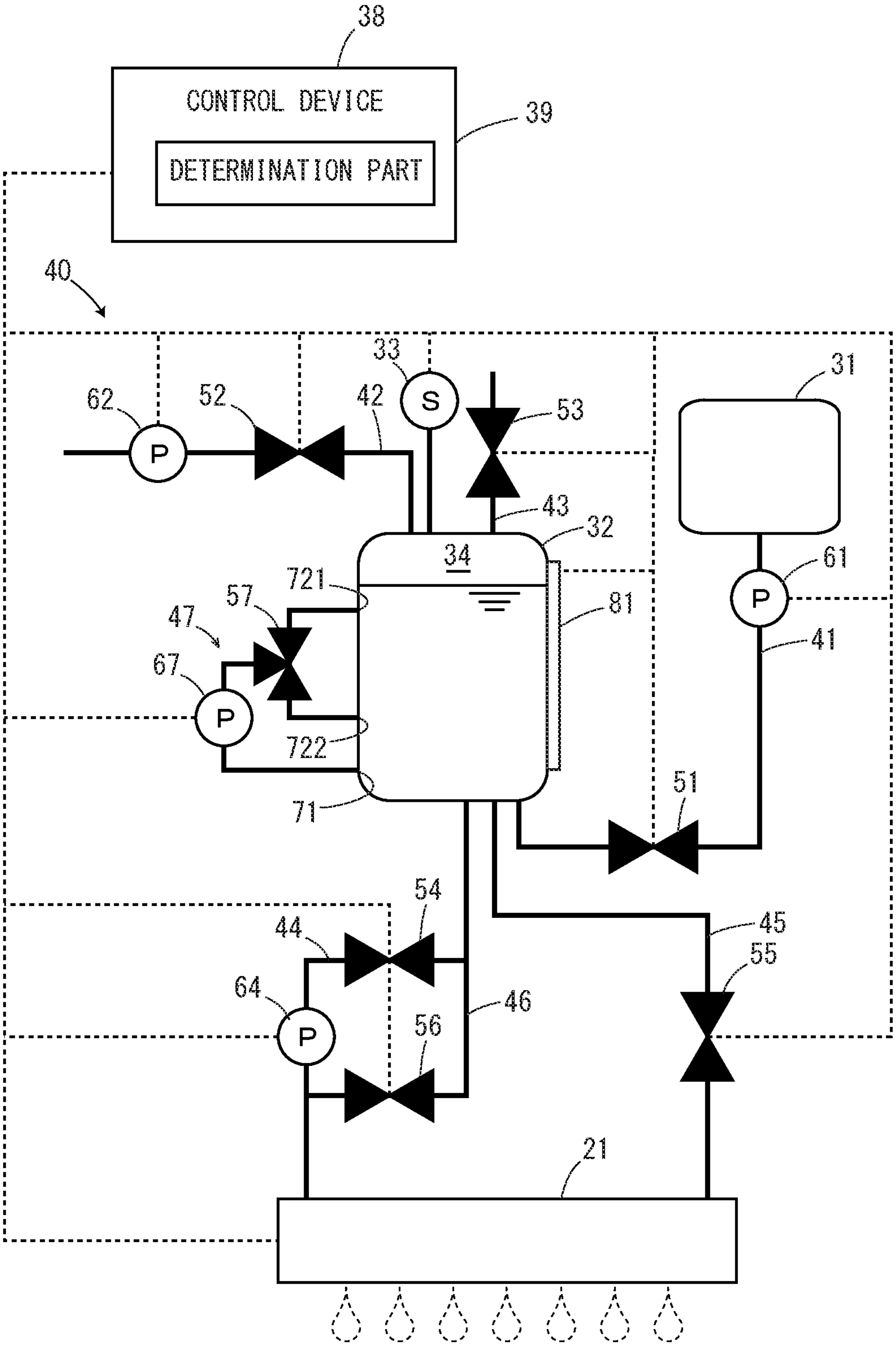
FIG. 2 is a schematic view showing an ink supply mechanism according to the embodiment of the present disclosure.
Figure 3:
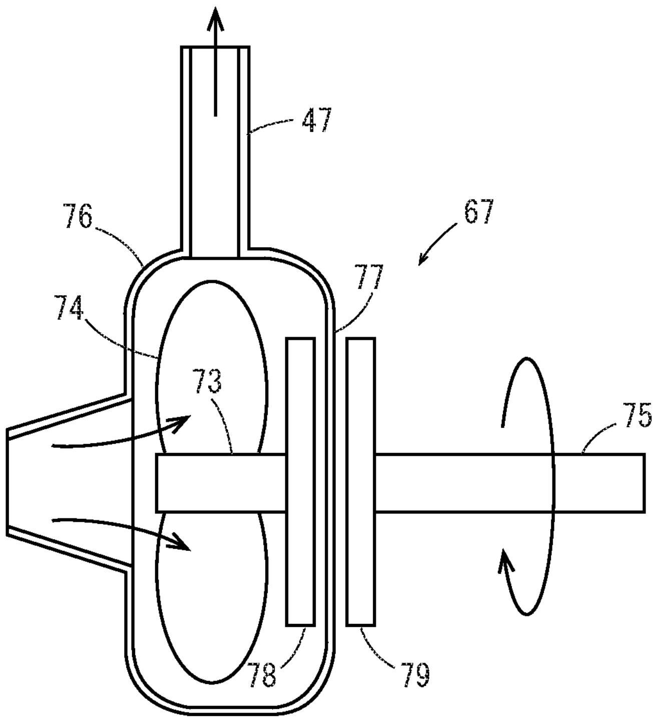
FIG. 3 is a schematic view showing a circulation pump according to the embodiment of the present disclosure.
Figure 4:
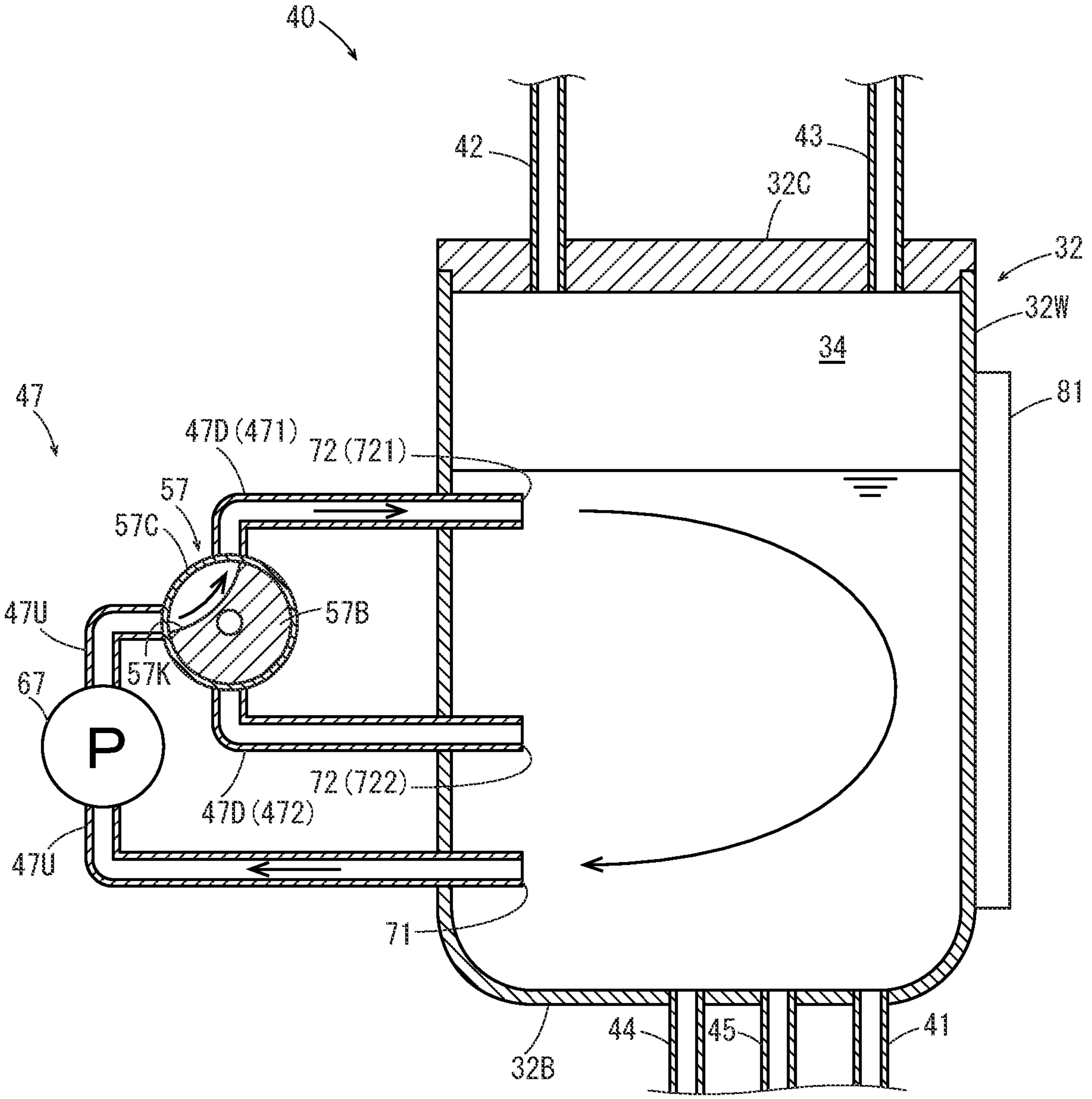
FIG. 4 is a sectional view schematically showing a degassing device according to the embodiment of the present disclosure.

[Degassing Device] A degassing device 40 according to the present embodiment will be described. FIG. 2 is a schematic view showing an ink supply mechanism according to the present embodiment. FIG. 3 is a schematic view showing a circulation pump 67 according to the present embodiment. FIG. 4 is a sectional view schematically showing the degassing device 40. Although the inkjet recording apparatus 1 according to the present embodiment is provided with the ink supply mechanism for each color of the ink, one ink supply mechanism will be described here because these ink supply mechanisms have the same configuration.

[Ink Tank] The ink tank 32 has a cylindrical side wall portion 32W whose axial direction is along the upper-and-lower direction, a bottom portion 32B for closing the lower end portion of the side wall portion 32W, and a lid body portion 32C for closing the upper end portion of the side wall portion 32W. The horizontal cross section of the inner surface of the side wall portion 32W is preferably circular. Preferably, the side wall portion 32W and the bottom portion 32B are integrally formed.

[Replenishment Flow Pass] A replenishment flow pass 41 communicates with the ink container 31 and the ink tank 32. One end portion of the replenishment flow pass 41 is connected to the side wall portion 32W of the ink tank 32 at a position below the liquid level. On the replenishment flow pass 41, a replenishment pump 61 and a replenishment valve 51 are provided.

[Air Release Flow Pass] An air release flow pass 43 is connected to the lid body portion 32C and communicates with an upper space 34 of the ink tank 32. On the air release flow pass 43, an air release valve 53 is provided.

[Pressure Decreasing Flow Pass] A pressure decreasing flow pass 42 is connected to the lid body portion 32C and communicates with the upper space 34 of the ink tank 32. On the pressure decreasing flow pass 42, a pressure decreasing pump 62 and a pressure decreasing valve 52 are provided.

[Supply Flow Pass] A supply flow pass 44 communicates with the ink tank 32 and the recording head 21. One end portion of the supply flow pass 44 is connected to the bottom portion 32B of the ink tank 32. On the supply flow pass 44, a supply valve 54 and a supply pump 64 are provided.

[Recovery Flow Pass] A recovery flow pass 45 communicates with the ink tank 32 and the recording head 21. One end portion of the recovery flow pass 45 is connected to the side wall portion 32W of the ink tank 32. On the recovery flow pass 45, a recovery valve 55 is provided.

[Bypass Flow Pass] The supply flow pass 44 includes a bypass flow pass 46 bypassing the supply valve 54 and the supply pump 64. On the bypass flow pass 46, a bypass valve 56 is provided.

[Circulation Flow Pass] A circulation flow pass 47 communicates with the vicinity of the bottom surface and the vicinity of the liquid surface of the ink of the ink tank 32. The circulation flow pass 47 has an outlet port 71 through which the ink flows out from the ink tank 32 into the circulation flow pass 47, and an inlet port 72 (a first inlet port 721 in FIG. 4) through which the ink flows in from the circulation flow pass 47 into the ink tank 32. The outlet port 71 is connected to the side wall portion 42W of the ink tank 32 at a position near the bottom portion 32B, and the inlet port 72 is connected to the side wall portion 32W of the ink tank 32 at a position near the liquid surface. That is, the inlet port 72 is positioned higher than the outlet port 71. On the circulation flow pass 47, a circulation pump 67 is provided. The ink is circulated via the circulation flow pass 47 by the circulation pump 67. The outlet port 71 may be connected to the bottom portion 32B of the ink tank 32. The circulation flow pass 47 will be described later in detail.

[Circulation Pump] Since the inside of the ink tank 32 is decreased in pressure during degassing operation, a reciprocating pump such as a diaphragm type pump is easily affected by the pressure decreasing. Therefore, as the circulation pump 67, a pump which pumps the ink using a rotational body is preferably used. For example, as the circulation pump 67, a non-capacity type pump such as a centrifugal pump, an oblique flow pump and an axial flow pump, and a capacity type rotary pump such as a vane pump, a gear pump, and a screw pump may be used. By using such a pump, unlike a reciprocating pump, it becomes possible to suppress effect of the pressure decreasing in the ink tank 32 and to circulate the ink.

In general, the recording head 21 may be included in the circulation flow pass 47 of the circulating degassing in type, but the present embodiment, the recording head 21 is not included in the circulation flow pass 47. That is, the circulation flow pass 47 is provided separately from the flow pass for supplying the ink to the recording head 21. Since the recording head 21 is not included in the circulation flow pass 47, a possibility that a meniscus formed in the nozzle of the recording head 21 is destroyed by the pressure decreasing at the degassing and the outside air enters the recording head 21 can be reduced.

As shown in FIG. 3, a pump shaft 73 and a motor shaft 75 of the circulation pump 67 are disposed on both sides of a partition wall 77 such that power can be transmitted without contact between them. A pump casing 76 is formed in the middle of the circulation flow pass 47, and the pump shaft 73 attached with an impeller 74 is housed in the pump casing 76. A motor (not shown) is provided outside the circulation flow pass 47. Disks 78, 79 are provided at the end portions of the pump shaft 73 and the motor shaft 75, and the disks 78, 79 face each other across the partition wall 77 of the pump casing 76. On the facing surfaces of the disks 78, 79, magnets (not shown) having alternating S and N poles in the circumferential direction are provided.

The pump shaft 73 and the motor shaft 75 are magnetically connected (magnet coupling), and the power is transmitted from the motor shaft 75 to the pump shaft 73 using a magnetic force. The impeller 74 in the pump casing 76 can be rotated without passing the motor shaft 75 through the pump casing 76 while the pump casing 76 being in a liquid-tightly sealed state. Since the space between the disks 78, 79 of the pump shaft 73 and the motor shaft 75 is partitioned by the partition wall 77 of the pump casing 76, even if an atmospheric pressure difference between the inside and the outside of the pump casing 76 occurs when the ink tank 32 is decreased in pressure, ink leakage caused by the atmospheric pressure difference is surely prevented.

[Control Device] The replenishment pump 61, the pressure decreasing pump 62, the supply pump 64, the circulation pump 67, the replenishment valve 51, the pressure decreasing valve 52, the air release valve 53, the supply valve 54, the recovery valve 55, and the bypass valve 56 are controlled by the control device 38. The control device 38 includes a determination part 39 which determines the necessity of the degassing operation in accordance with a leaving time of the ink. When the determination part 39 determines that the degassing of the ink is unnecessary, the degassing operation is not performed. Even if the air is resolved by leaving the ink, the ink can be used without degassing within an allowable time.

[Barometer] The ink tank 32 is provided with a barometer 33 which measures the atmospheric pressure in the upper space 34 of the ink tank 32. The control device 38 acquires atmospheric pressure data from the barometer 33.

Next, the basic operation of the degassing device 40 will be described. Here, in the following description, the standby state is set as an initial state.

[Standby State] In the standby state, the replenishment valve 51, the pressure decreasing valve 52, and the supply valve 54 are closed, and the air release valve 53, the recovery valve 55, and the bypass valve 56 are opened. The ink is stored in the ink tank 32, the liquid surface touches the air in the upper space 34 opened to the atmosphere, and then the air is dissolved in the ink with the lapse of time.

In the standby state, the determination part 39 of the control device 38 determines whether the degassing is necessary. For example, the control device 38 is provided with a timer, and the leaving time of the ink is measured by the timer. An amount of dissolved gas of the ink can be estimated from one or more parameters such as an atmospheric a pressure, temperature of the ink, and an elapsed time from the last printing. Therefore, the determination part 39 stores conversion information indicating a correspondence relationship between each parameter and the amount of dissolved gas of the ink, and estimates the amount of dissolved gas of the ink based on each parameter. In addition, the determination part 39 stores conversion information indicating a correspondence relationship between the amount of dissolved gas of the ink and the allowable time, and the allowable time is set based on the amount of dissolved gas of the ink. The allowable time is a time during which the printing is allowed without degassing even if the ink is left. For the conversion information indicating the correspondence relationship between each parameter and the amount of dissolved gas of the ink and the conversion information indicating the correspondence relationship between the amount of dissolved gas of the ink and the allowable time, map data, a lookup table, a conversion equation, and the like are used. These map data, lookup table, and conversion equation are obtained experimentally, empirically, and theoretically in advance. In the present embodiment, an amount of dissolved oxygen is used as the amount of dissolved gas.

When the leaving time of the ink is within the allowable time, the determination part 39 determines that the degassing is unnecessary because an oxygen saturation degree is low. When the leaving time of the ink exceeds the allowable time, the determination part 39 determines that the degassing is necessary because the oxygen saturation degree is high. If the degassing is necessary, the control device 38 performs the following pressure decreasing process and the degassing process.

[Pressure Decreasing Process] In the pressure decreasing process, the control device 38 closes the replenishment valve 51, the air release valve 53, the supply valve 54, the recovery valve 55, and the bypass valve 56, opens the pressure decreasing valve 52, and drives the pressure decreasing pump 62. Then, the air is sucked out from the upper space 34 of the ink tank 32, and the upper space 34 is decreased in pressure. The control device 38 stops the pressure decreasing pump 62 when the atmospheric pressure in the upper space 34 indicated by the barometer 33 reaches a target value (for example, −50 [kPa]).

[Degassing Process] When the pressure decreasing process is completed, the control device 38 performs the degassing process. In the degassing process, the control device 38 closes the replenishment valve 51, the pressure decreasing valve 52, the air release valve 53, the supply valve 54, the recovery valve 55, and the bypass valve 56, and drives the circulation pump 67 for a predetermined time. When the circulation pump 67 is driven, the ink in the ink tank 32 circulates through the circulation flow pass 47. The ink near the bottom surface of the ink tank 32 where an amount of dissolved gas is large flows out into the circulation flow pass 47 through the outlet port 71, and the ink in the circulation flow pass 47 flows into the vicinity of the liquid surface in the ink tank 32 through the inlet port 72 (the first inflow port 721 in FIG. 4). The liquid surface of the ink is exposed to the decreased pressure atmosphere to remove the air dissolved in the ink near the liquid surface. By smoothly replacing the ink near the liquid surface where an amount of dissolved gas is small with the ink near the bottom surface where an amount of dissolved gas is large, the degassing efficiency is improved. In addition, unlike the stirring degassing type, the depth of the ink and the tank diameter are not affected, and the driving sound of the circulation pump 67 is more suppressed than the rotating sound of the stirrer, and the quietness is enhanced.

[Head Circulation Process] A head circulation process may be performed before or after the degassing process or may be performed at a unique timing. In the head circulation process, the control device 38 closes the replenishment valve 51, the pressure decreasing valve 52, and the bypass valve 56, opens the air release valve 53, the supply valve 54, and the recovery valve 55, and drives the supply pump 64. Then, the ink is supplied from the ink tank 32 to the recording head 21 through the supply flow pass 44, and the ink is recovered from the recording head 21 to the ink tank 32 through the recovery flow pass 45. By circulating the ink between the recording head 21 and the ink tank 32, the ink with increased viscosity in the recording head 21 is replaced and bubbles are removed from the recording head 21.

[Printing Process] During the printing operation by the recording head 21, the replenishment valve 51, the pressure decreasing valve 52, and the supply valve 54 are closed, and the air release valve 53, the recovery valve 55, and the bypass valve 56 are opened. That is, during the printing operation, the ink tank 32 is released to the atmosphere and has the atmospheric pressure. During the printing operation, the pressure in the ink tank 32 is not decreased such that substantial degassing does not occur. Every time when the ink is ejected from the recording head 21, the ink is supplied from the ink tank 32 to the recording head 21 through the bypass flow pass 46 and the recovery flow pass 45. In some cases, the ink is replenished in the middle of ink replacement operation, printing operation, or the like. During the ink replenishment operation, the replenishment valve 51 is opened and the replenishment pump 61 is driven. The ink is replenished from the ink container 31 to the ink tank 32 through the replenishment flow pass 41 by driving the replenishment pump 61.

FIG. 1 and the others are schematically drawn, and the recording head 21 is actually disposed above the ink tank 32. A negative pressure is applied to the ink in the recording head 21 by a head difference from the ink in the ink tank 32, and a meniscus is formed in the nozzle of the recording head 21 by the negative pressure. After the ink is ejected from the recording head 21, the surface tension of the ink acts to reduce the surface area of the meniscus, and the resulting negative pressure draws the reduced amount of the ink from the ink tank 32 into the recording head 21. The recovery valve 55 may be closed, and the ink may be supplied to the recording head 21 only from the bypass flow pass 46.

If the pressure in the ink tank 32 is decreased to the extent that substantial degassing occurs in a state where the recording head 21 and the ink tank 32 are connected, the meniscus of the nozzle may be destroyed. Even if the meniscus is not destroyed, there is a risk that the shape of the meniscus in the nozzle is changed compared with the case where the ink tank 32 is released to the atmosphere, and the ejecting characteristic of the ink is changed. In the present embodiment, since the pressure in the ink tank 32 is not decreased so as not to cause substantial degassing during the printing operation, the meniscus in the nozzle of the recording head 21 is not destroyed, and since its shape is not changed, the ejection characteristic is not changed.

Figure 5:
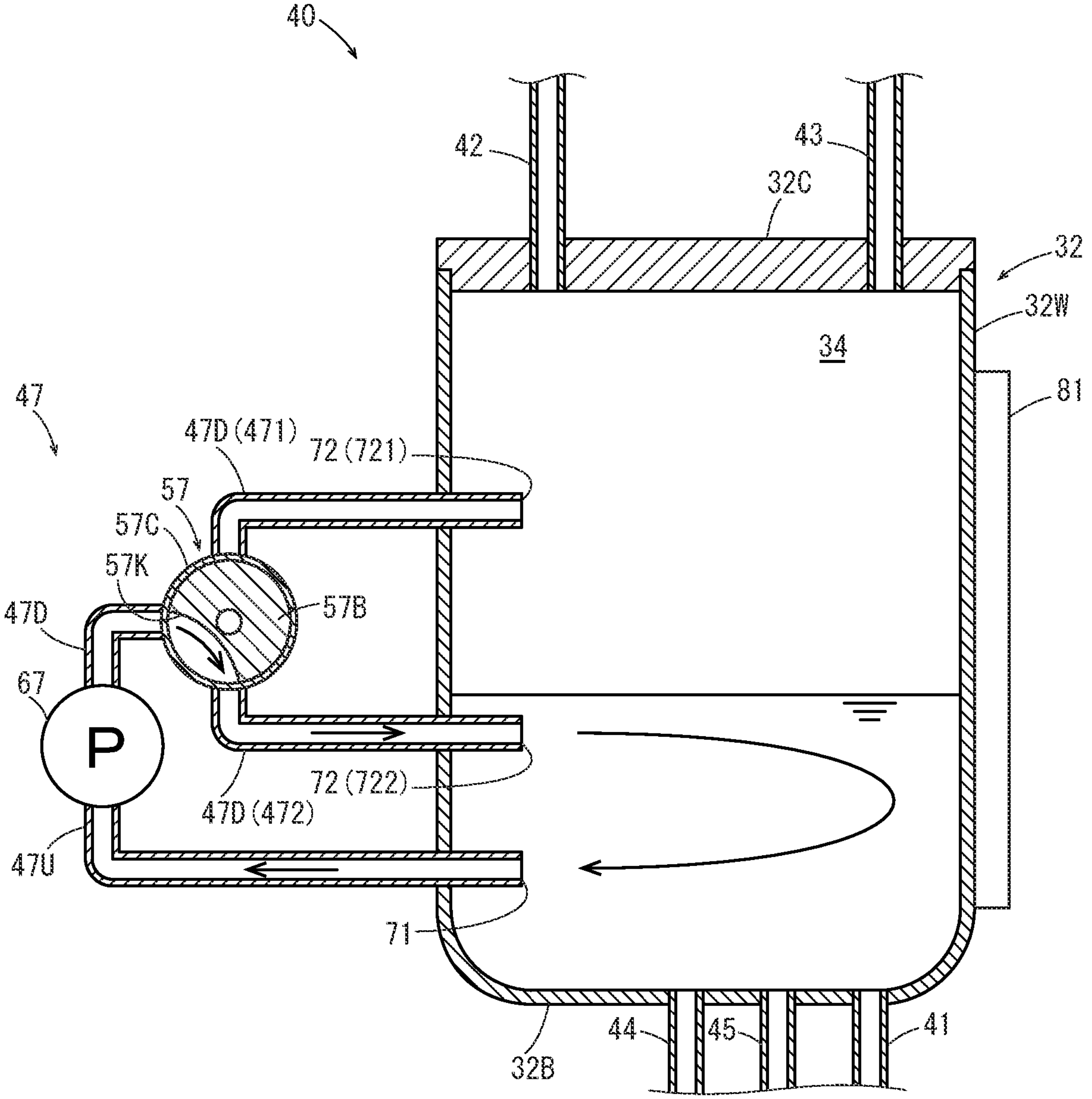
FIG. 5 is a sectional view schematically showing the degassing device according to the embodiment of the present disclosure.

Next, the features of this embodiment will be described in detail (see FIG. 4, FIG. 5). FIG. 5 is a sectional view schematically showing the degassing device 40. FIG. 5 shows a state in which the liquid level and the height of the inlet port 72 are changed with respect to FIG. 4.

The degassing device 40 according to the present embodiment removes air dissolved in a liquid under a pressure decreased atmosphere, and includes the liquid tank (for example, the ink tank 32) in which the liquid is stored, the pressure decreasing device (for example, the pressure decreasing pump 62) which decreases the pressure in the liquid tank, the circulation flow pass 47 which communicates different positions of the liquid tank, the circulation device (for example, the circulation pump 67) which circulates the liquid through the circulation flow pass 47, and a variable mechanism which changes the height of the inlet port 72 from the circulation flow pass 47 to the liquid tank according to the height of the liquid surface in the liquid tank. Specifically, they are as follows. Since the ink tank 32, the pressure decreasing pump 62, and the circulation pump 67 are as described above, the circulation flow pass 47 and the variable mechanism will be mainly described below. In the following description, the upstream side means the upstream side in the circulation direction of the ink in the circulation flow pass 47, and the downstream side means the downstream side in the circulation direction of the ink in the circulation flow pass 47.

[Circulation Flow Pass, Variable Mechanism] The circulation pump 67 is provided on the circulation flow pass 47. Further, on the circulation flow pass 47, a flow pass switching valve 57 is provided on the downstream side of the circulation pump 67. The circulation flow pass 47 includes an upstream part 47U on the upstream side of the flow pass switching valve 57 and a downstream part 47D on the downstream side of the flow pass switching valve 57. The circulation pump 67 is provided on the upstream part 47U. The outlet port 71, which is the upstream end of the upstream part 47U, is connected to the side wall portion 32W of the ink tank 32 at a position closer to the bottom portion 32B.

The downstream part 47D includes a first downstream portion 471 and a second downstream portion 472 in parallel with each other. The circulation flow pass 47 includes a plurality of inlet ports 72. The inlet ports 72 include a first inlet port 721 provided at the downstream end of the first downstream portion 471 and a second inlet port 722 provided at the downstream end of the second downstream portion 472. The inlet ports 72 (the first inlet port 721 and the second inlet port 722) are provided higher than the outlet port 71. The second inlet port 722 is provided lower than the first inlet port 721.

The flow pass switching valve 57 is a three-way valve provided with a spherical or cylindrical valve element 57B and a casing 57C for housing the valve element 57B. The valve element 57B is provided with a notch 57K. The flow pass switching valve 57 includes a driving source (not shown) for rotating the valve element 57B. The driving source includes, for example, a motor and the like, and is controlled by the control device 38. The control device 38 changes the posture of the valve element 57B to a first posture (see FIG. 4) in which the notch 57K communicates the upstream part 47U with the first downstream portion 471, and a second posture (see FIG. 5) in which the notch 57K communicates the upstream part 47U with the second downstream portion 472.

An acquisition part 81 acquires liquid level information indicating the height of the liquid level in the ink tank 32. The acquisition part 81 is, for example, a capacitive sensor provided along the outer surface of the side wall portion 32W and whose longitudinal direction is along the upper-and-lower direction. The inlet ports 72, the flow pass switching valve 57, and the acquisition part 81 constitute the variable mechanism.

Figure 6:
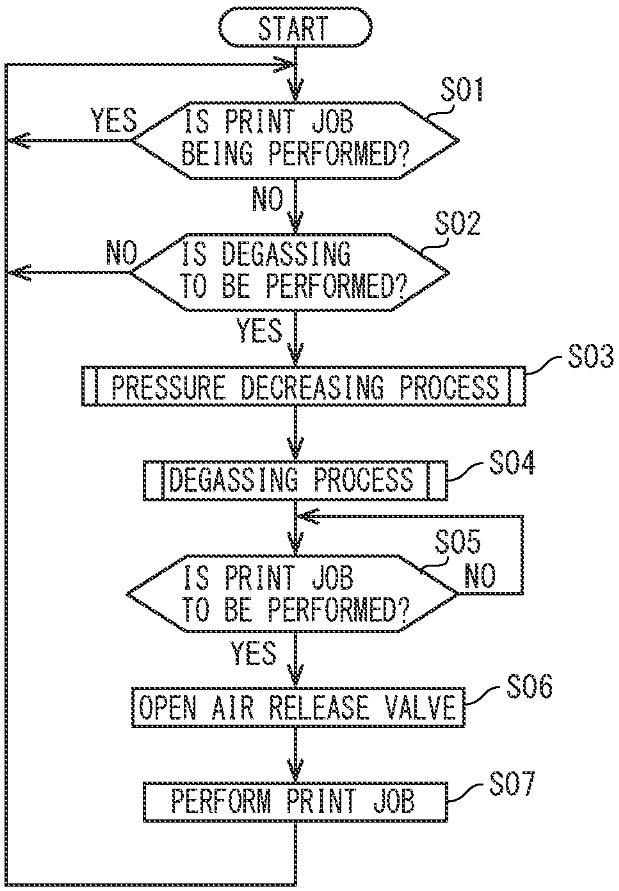
FIG. 6 is a flowchart showing all operations of the degassing device according to the embodiment of the present disclosure.
Figure 7:
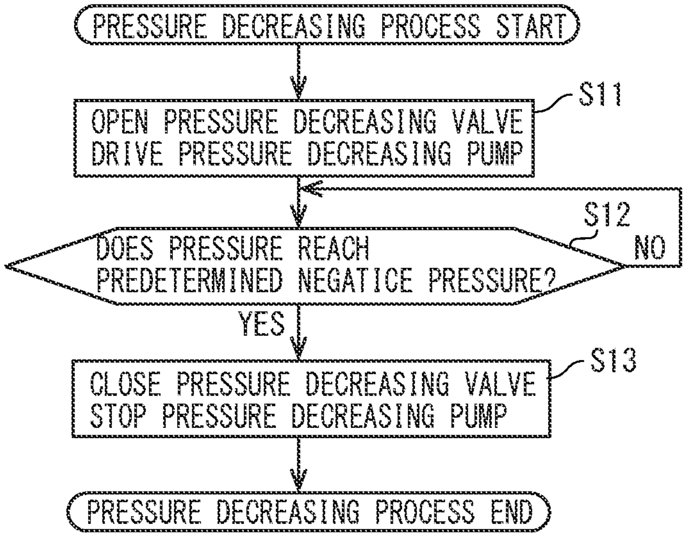
FIG. 7 is a flowchart showing an operation in a pressure decreasing process of the degassing device according to the embodiment of the present disclosure.
Figure 8:
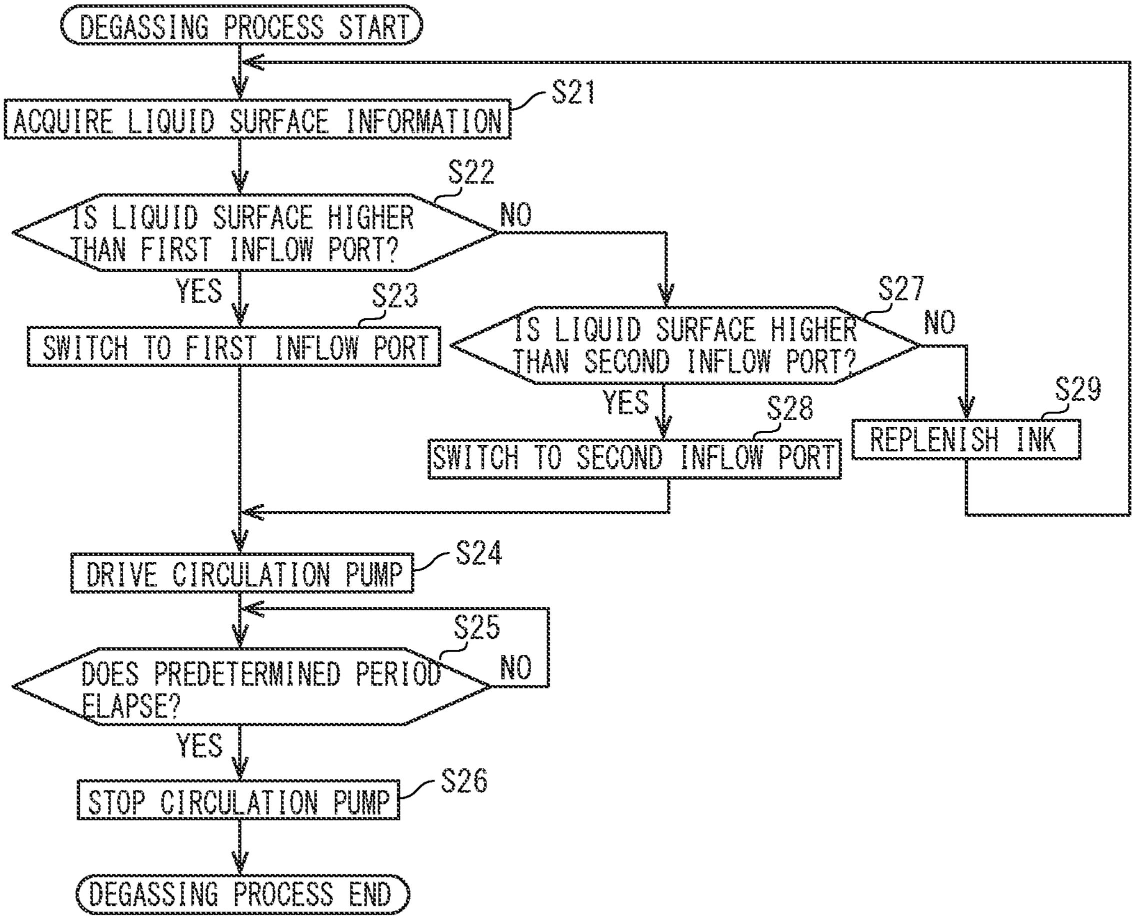
FIG. 8 is a flowchart showing an operation in a degassing process of the degassing device according to the embodiment of the present disclosure.

Next, the operation of the degassing device 40 will be described. FIG. 6 is a flowchart showing all operations of the degassing device 40. FIG. 7 is a flowchart showing the operation of the pressure decreasing process of the degassing device 40. FIG. 8 is a flowchart showing the operation of the degassing process of the degassing device 40.

Here, in the following description, the standby state is set as an initial state. In the standby state, the replenishment valve 51, the pressure decreasing valve 52, and the supply valve 54 are closed, and the air release valve 53, the recovery valve 55, and the bypass valve 56 are opened. The ink is stored in the ink tank 32, and the liquid surface touches the air in the upper space 34 opened to the atmosphere, and then the air is dissolved in the ink with the lapse of time.

First, the control device 38 determines whether the print job is being performed (FIG. 6, step S01). When the print job is being performed (step S01: YES), the control device 38 repeats the determination in step S01. On the other hand, when the print job is not being performed (step S01: NO), the determination part 39 of the control device 38 determines whether the degassing is to be performed (step S02). For example, the control device 38 (see FIG. 2) is provided with a timer, and the leaving time of the ink is measured by the timer. An amount of dissolved gas of the ink can be estimated from one or more parameters such as an atmospheric pressure, a temperature of the ink, and an elapsed time from the last printing. Therefore, the determination part 39 stores conversion information indicating a correspondence relationship between each parameter and the amount of dissolved gas of the ink, and estimates the amount of dissolved gas of the ink based on each parameter. The determination part 39 stores conversion information indicating a correspondence relationship between the amount of dissolved gas of the ink and the allowable time, and the allowable time is set based on the amount of dissolved gas of the ink. The allowable time is the time during which the printing is allowed without degassing even if the ink is left.

When the leaving time of the ink is within the allowable time, since an oxygen saturation degree is low, the determination part 39 determines that the degassing is unnecessary and the degassing operation is not performed. When the leaving time of the ink exceeds the allowable time, since the oxygen saturation degree is high, the determination part 39 determines that the degassing is necessary, and the degassing operation is performed. For the conversion information indicating the correspondence relationship between each parameter and the amount of dissolved gas of the ink and the conversion information indicating the correspondence relationship between the amount of dissolved gas of the ink and the allowable time, map data, a lookup table, a conversion equation, and the like are used. These map data, lookup table, and conversion equation are obtained experimentally, empirically, and theoretically in advance.

When it is determined in step S02 that the degassing is not performed (step S02: NO), the control device 38 repeats the determination in step S01. On the other hand, when it is determined that the degassing is to be performed (step S02: YES), the control device 38 performs the pressure decreasing process (step S03, see FIG. 7). Specifically, the control device 38 closes the replenishment valve 51, the air release valve 53, the supply valve 54, the recovery valve 55, and the bypass valve 56, opens the pressure decreasing valve 52, and drives the pressure decreasing pump 62 (step S11). Next, the control device 38 determines whether the atmospheric pressure in the ink tank 32 indicated by the barometer 33 reaches a predetermined negative pressure (step S12). When it is determined that the atmospheric pressure in the ink tank 32 does not reach the predetermined negative pressure (step S12: NO), the control device 38 repeats the determination in step S 12 while driving the pressure decreasing pump 62. On the other hand, when it is determined that the atmospheric pressure in the ink tank 32 reaches the predetermined negative pressure (step S12: YES), the control device 38 closes the pressure decreasing valve 52 and stops the pressure decreasing pump 62 (step S13).

Next, the control device 38 performs the degassing process (step S04 of FIG. 6, see FIG. 8). Specifically, the acquisition part 81 acquires the liquid level information (step S21). Next, the control device 38 determines whether the height of the liquid level indicated by the liquid level information acquired by the acquisition part 81 is located above the first inlet port 721 (step S22). When it is determined that the liquid level is located above the first inlet port 721 (step S22: YES), the control device 38 changes the valve element 57B of the flow pass switching valve 57 to the first posture, thereby switching the inflow of the ink into the ink tank 32 to the first inlet port 721 (step S23), and drives the circulation pump 67 (step S24).

When the circulation pump 67 is driven, the ink in the ink tank 32 is circulated through the circulation flow pass 47. The ink near the bottom surface of the ink tank 32 where an amount of dissolved gas is large flows out into the circulation flow pass 47 through the outlet port 71, and the ink in the circulation flow pass 47 flows into the vicinity of the liquid surface in the ink tank 32 through the inlet port 72. The liquid surface of the ink is exposed to the reduced pressure atmosphere to remove the air dissolved in the ink near the liquid surface. Since the ink near the liquid surface where an amount of dissolved gas is small is smoothly replaced with the ink near the bottom surface where an amount of dissolved gas is large, the degassing efficiency is improved.

On the other hand, when it is determined that the liquid surface is not located above the first inlet port 721 (step S22: NO), the control device 38 determines whether the liquid surface is located above the second inlet port 722 (step S27). When it is determined that the liquid level is located above the second inlet port 722 port (step S27: YES), the control device 38 changes the valve element 57B of the flow pass switching valve 57 to the second posture, thereby switching the inflow of the ink into the ink tank 32 to the second inlet port 722 (step S28), and drives the circulation pump 67 (step S24).

On the other hand, when it is determined that the liquid surface is not located above the second inlet port 722 (step S27: NO), the control device 38 opens the replenishment valve 51, drives the replenishment pump 61 to replenish a predetermined amount of the ink from the ink container 31 to the ink tank 32, closes the replenishment valve 51 (step S29), and repeats the steps from step S21.

Following step S24, the control device 38 determines whether a predetermined time has elapsed since the start of driving the circulation pump 67 at step S24 (step S25). When it is determined that the predetermined time has not elapsed (step S25: NO), the control device 38 repeats the determination in step S24 while driving the circulation pump 67. On the other hand, when it is determined that the predetermined time has elapsed (step S25: YES), the control device 38 stops the circulation pump 67 (step S26). At the end of the degassing process, all valves are closed, so that the pressure decreased state is maintained.

Next, the control device 38 determines whether the print job is to be performed (step S05 in FIG. 6). When it is determined that the print job is not performed (step S05: NO), the control device 38 repeats the determination in step S05. On the other hand, when it is determined that the print job is to be performed (step S05: YES), the control device 38 opens the air release valve 53 (step S06), performs the print job (step S07), and repeats the steps after step S01.

The degassing device 40 according to the present embodiment described above removes the air dissolved in the liquid under a pressure decreased atmosphere, includes the liquid tank (for example, the ink tank 32) in which the liquid is stored, the pressure decreasing device (for example, the pressure decreasing pump 62) which decreases the pressure in the liquid tank, the circulation flow pass 47 which communicates different positions of the liquid tank, the circulation device (for example, the circulation pump 67) which circulates the liquid through the circulation flow pass 47, and the variable mechanism which changes the height of the inlet port 72 from the circulation flow pass 47 to the liquid tank according to the height of the liquid surface in the liquid tank. According to this configuration, even when the height of the liquid surface changes, since the ink in the circulation flow pass 47 flows toward the vicinity of the liquid surface, the deterioration of the degassing efficiency due to the change in the height of the liquid surface can be suppressed.

Further, the degassing device 40 according to the present embodiment includes the acquisition part 81 which acquires the liquid level information indicating the height of the liquid level in the liquid tank, and the variable mechanism changes the height of the inlet port 72 in accordance with the height indicated by the liquid level information acquired by the acquisition part 81. According to this configuration, the accuracy of height control of the inlet port 72 can be improved.

Further, according to the degassing device 40 according to the present embodiment, the circulation flow pass 47 includes the inlet ports 72 having different heights from each other, and the variable mechanism allows the liquid to flow in from the inlet port 72 located below the height indicated by the liquid level information and closest to the height indicated by the liquid level information among the inlet ports 72. According to this configuration, since the liquid flows in from the inlet port 72 closest to the liquid surface below the liquid surface, the degassing efficiency can be improved.

The degassing device 40 according to the present embodiment includes the replenishment pump 61 which replenishes the liquid to the liquid tank when the height indicated by the liquid level information is lower than any of the inlet ports 72. When the liquid level is lowered below the inlet ports 72, the liquid falls toward the liquid level, which may disturb the circulation of the liquid and lower the degassing efficiency. According to the present embodiment, even when the liquid level is lowered below the inlet ports 72, the liquid can be replenished so as to prepare a condition to allow the liquid to flow in below the liquid level, thereby suppressing the deterioration of the degassing efficiency.

According to the degassing device 40 according to the present embodiment, the inlet ports 72 are provided above the outlet port 71 from the liquid tank to the circulation flow pass 47. According to this configuration, the ink near the liquid surface where the amount of dissolved gas is small is replaced with the ink near the bottom surface where the amount of dissolved gas is large, so that the degassing efficiency can be improved.

The inkjet recording apparatus 1 according to the present embodiment is provided with the degassing device 40 and a recording head 21 which ejects the liquid degassed by the degassing device 40 to the sheet S. According to this configuration, the deterioration of image quality due to the generation of bubbles can be suppressed.

The above embodiment may be modified as follows.

In the above embodiment, the capacitive sensor is exemplified as an example of the acquisition part 81, but the acquisition part 81 may be a method for detecting a position of a floating body including a magnet, a method for detecting a liquid surface by a plurality of electrodes of different lengths suspended from the lid body portion 32C, or the like. Alternatively, the acquisition part 81 may estimate the height of the liquid surface based on a consumption amount of ink determined from the image data.

In the above embodiment, the two inlet ports 72 are provided as the plurality of inlet ports 72, but three or more inlet ports 72 may be provided.

Figure 9:
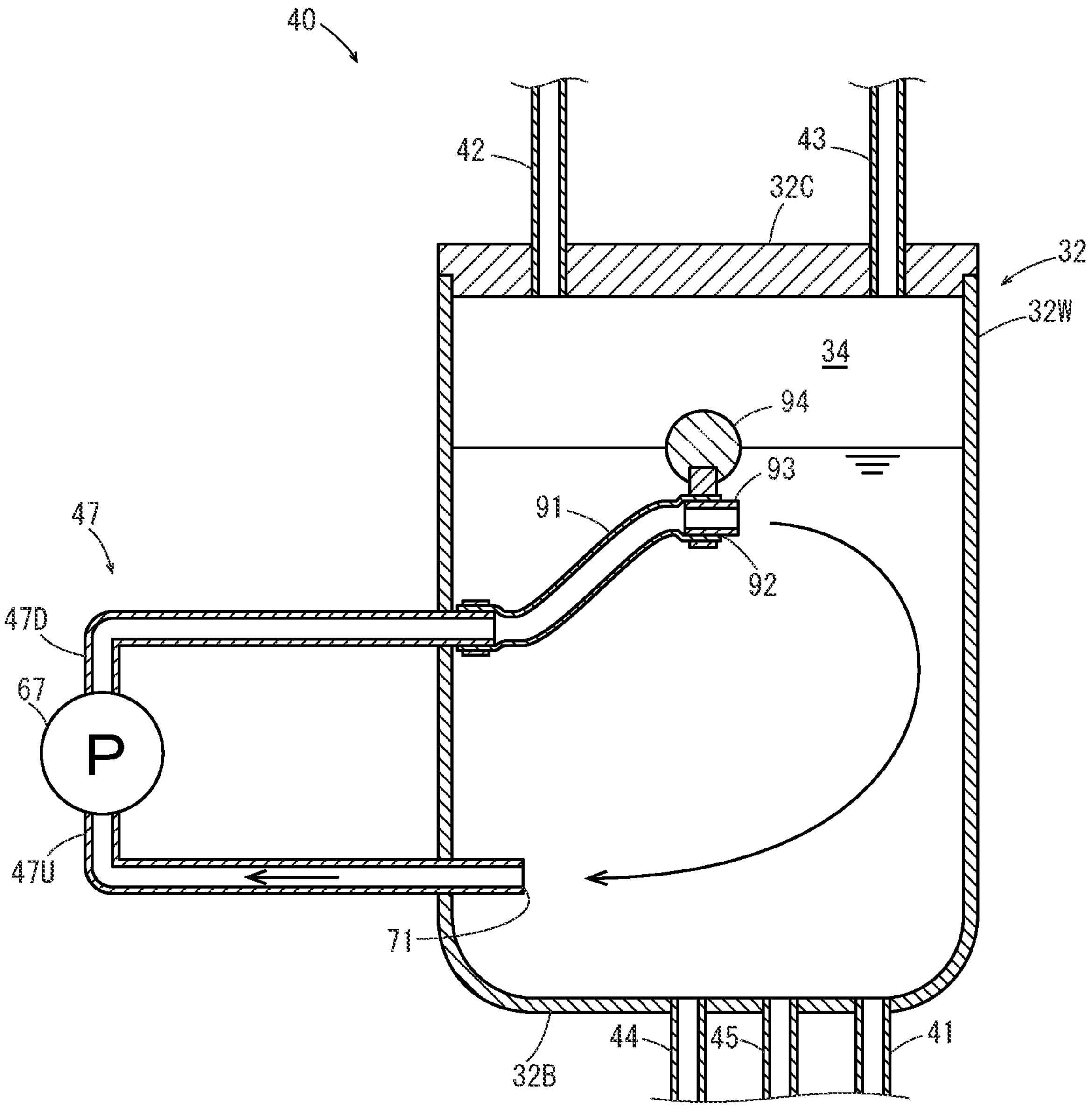
FIG. 9 is a sectional view schematically showing the degassing device according to a modified example of the embodiment of the present disclosure.
Figure 10:
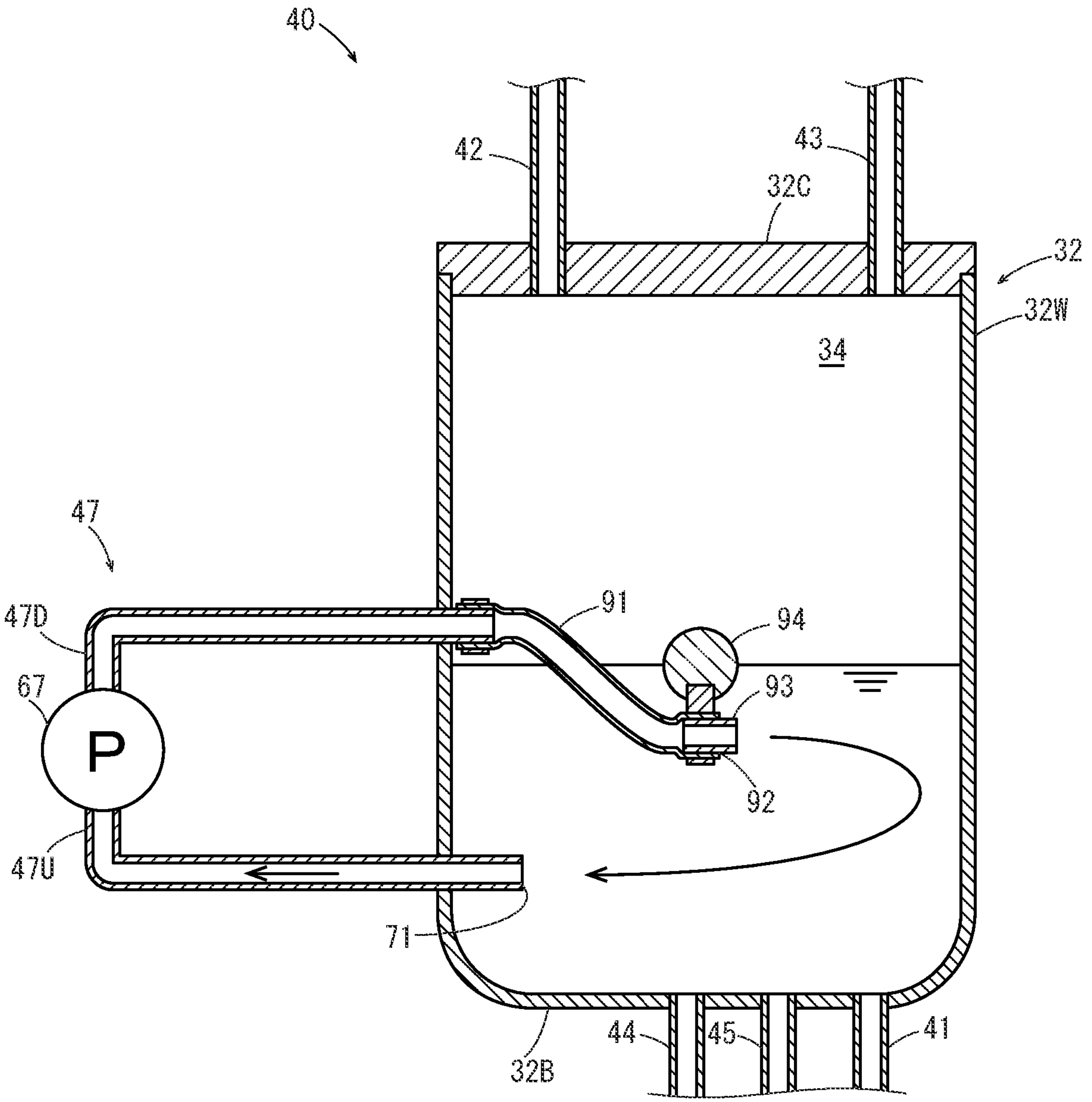
FIG. 10 is a sectional view schematically showing the degassing device according to the modified example of the embodiment of the present disclosure. the ink supply mechanism according to a modified example

FIG. 9 and FIG. 10 are sectional views schematically showing the degassing device 40 according to a modified example of the above embodiment. In this modified example, a flow pass member 91 made of flexible material is connected to the downstream side portion of the circulation flow pass 47. The downstream end portion of the flow pass member 91 is an inlet port 92 from the circulation flow pass 47 to the ink tank 32. The inlet port 92 is provided with a cap 93. A floating body 94 made of material which can float on the ink is attached to the cap 93. When the height of the liquid surface is changed, the floating body 94 is lifted and lowered with the liquid surface. The flow pass member 91 has flexibility such that the resistance to the lifting and lowering of the floating body 94 is negligible, and it bends following the lifting and lowering of the floating body 94. According to this configuration, the height of the inlet port 92 can be changed by a simple configuration. Further, a driving force for changing the height of the inlet port 92 is unnecessary. It is noted that an actuator (not shown) for lifting and lowering the cap 93 and the acquisition part 81 may be provided, and the actuator may be configured to lift and lower the cap 93 in accordance with the height indicated by the liquid level information acquired by the acquisition part 81.

[Another Modified Examples] In the above embodiment, an example in which the degassing device 40 is provided in the inkjet recording apparatus 1 is shown, but the degassing device 40 can also be applied to devices used in other fields such as a semiconductor manufacturing field and a display manufacturing field. That is, it can be applied to degas chemical solution, electrolytic solution, liquid resin, adhesive, solvent, lubricating oil, liquid food, essence, and the like, other than the ink.

In the above embodiment, the pressure decreasing pump 62 is exemplified as the pressure decreasing device, but the pressure decreasing device may be a device capable of decreasing pressure in the ink tank 32, for example, the pressure decreasing device may be an ejector.

In the above embodiment, the circulation pump 67 is exemplified as the pressure circulation device, but the circulation device may be a device capable of circulating the ink in the circulation flow pass 47, and the circulation device may be an ejector.

The invention claimed is:

1. A degassing device which removes air dissolved in a liquid under a pressure decreased atmosphere, the degassing device comprising:

a liquid tank in which the liquid is stored;

a pressure decreasing device which decreases pressure in the liquid tank;

a circulation flow pass which communicates different positions of the liquid tank;

a circulation device which circulates the liquid through the circulation flow pass; and a variable mechanism which changes a height of an inlet port from the circulation flow pass to the liquid tank in accordance with a height of a liquid surface in the liquid tank.

2. The degassing device according to claim 1, comprising:

an acquisition part which acquires liquid level information indicating the height of the liquid level in the liquid tank, and the variable mechanism changes the height of the inlet port in accordance with the height indicated by the liquid level information acquired by the acquisition part.

3. The degassing device according to claim 2, wherein the circulation flow pass includes at least two inlet ports having different heights from each other, and the variable mechanism allows the liquid to flow in from the inlet port located below the height indicated by the liquid level information and closest to the height indicated by the liquid level information among the inlet ports.

4. The degassing device according to claim 3, comprising:

a replenishment pump which replenishes the liquid to the liquid tank when the height indicated by the liquid level information is lower than any of the inlet ports.

5. The degassing device according to claim 3, wherein the inlet ports are provided above an outlet port from the liquid tank to the circulation flow pass.

6. An inkjet recording apparatus comprising:

the degassing device according to claim 1; and a recording head which ejects the liquid degassed by the degassing device.

* * * * *